United States Patent
Bollard et al.

[15] 3,657,719
[45] Apr. 18, 1972

[54] AIRBORNE PULSED RANGE FINDING RADAR

[72] Inventors: David Rooksby Bollard, North Cambridge; William Alfred Jenkins, Westcliff-on-Sea, both of England

[73] Assignee: Ekco Electronics Limited, Essex, England

[22] Filed: Aug. 20, 1969

[21] Appl. No.: 851,576

[30] Foreign Application Priority Data

Aug. 21, 1968 Great Britain.....................40,084/68

[52] U.S. Cl...........................................343/7 TA, 343/13 R
[51] Int. Cl.................................................G01s 9/04
[58] Field of Search...........................343/7 RS, 7 TA, 12, 13

[56] References Cited

UNITED STATES PATENTS

| | | | |
|---|---|---|---|
| 3,210,760 | 10/1965 | Olson et al............................ | 343/7 TA |
| 3,277,467 | 10/1966 | Barney................................. | 343/7 TA |
| 3,368,218 | 2/1968 | Fenn et al............................. | 343/12 X |
| 3,383,684 | 5/1968 | Long et al............................. | 343/13 X |

*Primary Examiner*—Malcolm F. Hubler
*Attorney*—Beveridge & De Grandi

[57] ABSTRACT

An airborne pulsed range-finding radar adapted for use in an aircraft and suitable for terrain range finding by a downwardly inclined radar beam, comprises means to apply to a voltage storage device for successive short periods a derived voltage derived from and dependent upon a detected received video echo signal, means to produce an integrated difference voltage by integrating the difference between the derived voltage and a stored voltage in said voltage storage device when said derived voltage is the greater, control means operable to initiate each said short period at a time having a relation to the time of commencement of each transmitted radar pulse determined by the instantaneous magnitude of the integrated difference voltage, and means to utilize the integrated difference voltage as an indication of range.

12 Claims, 5 Drawing Figures

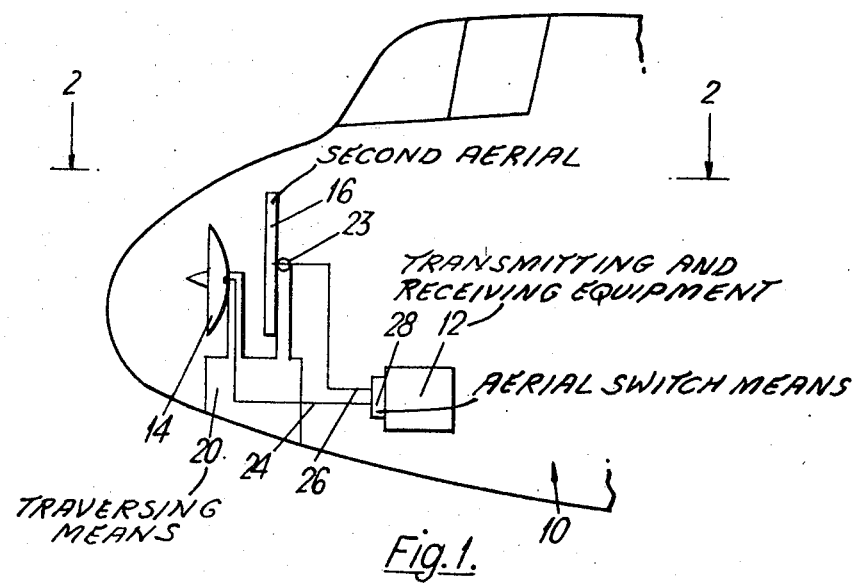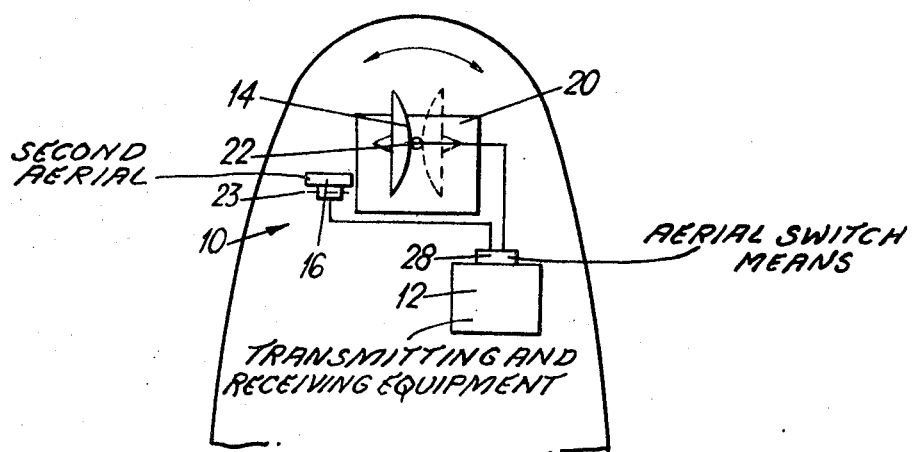

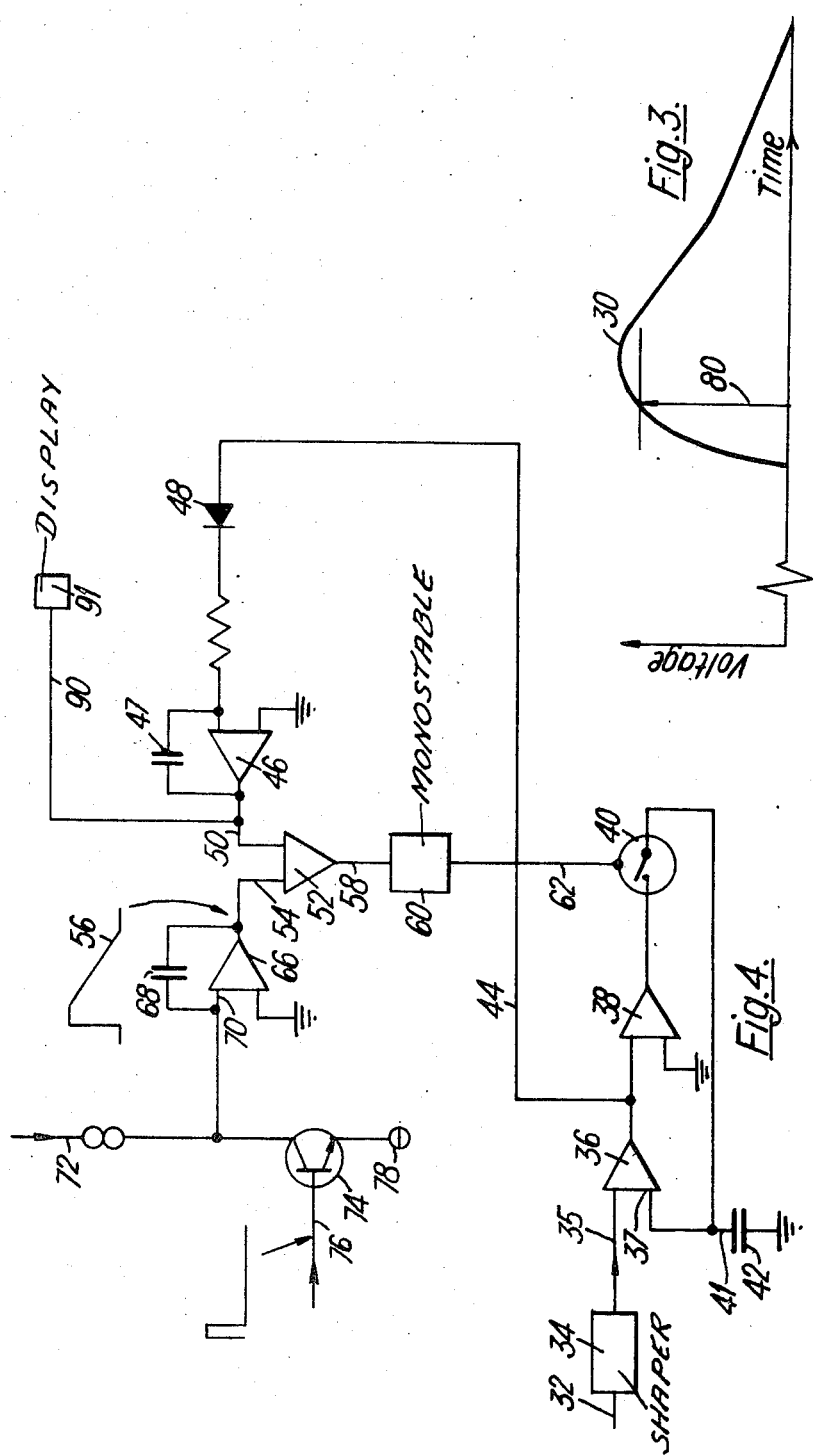

3,657,719

AIRBORNE PULSED RANGE FINDING RADAR

This invention relates to a pulsed range-finding radar adapted for use in an aircraft and suitable for terrain range finding.

In one aspect, although not so restricted, there is provided a pulsed range-finding radar comprising means to transmit radar pulses; a voltage storage device; applying means to apply to said voltage storage device for successive periods of time a derived voltage derived from and dependent upon a detected received video echo signal; producing means to produce an integrated difference voltage by integrating the difference between the derived voltage and a stored voltage in said voltage storage device when said derived voltage is the greater; control means having an input connected to said producing means and an output connected to said applying means operable to initiate each said period at a time having a relation to the time of commencement of each transmitted radar pulse determined by the instantaneous magnitude of the integrated difference voltage; and means to utilize the integrated difference voltage as an indication of range.

The radar may comprise comparator means connected between the voltage storage device and the applying means to compare the derived and stored voltage during a said period, and if the derived voltage exceeds the stored voltage in said voltage storage device, to increase the stored voltage to the value of the said derived voltage during said period.

There may be reference means actuated in fixed time relation with the commencement of each transmitted radar pulse to initiate a reference ramp voltage of predetermined rate of change with time; said control means operating, each time said reference ramp voltage reaches a predetermined relative value in relation to a second voltage with which it is compared, to initiate each said short period the producing means comprising; comparator means to compare the stored voltage in said voltage storage device with the said derived voltage to produce a difference voltage when said derived voltage exceeds said stored voltage, and integrating means to integrate said difference voltage to produce the said integrated difference voltage, the integrated difference voltage being utilized as said second voltage.

The comparator means may comprise a two input amplifier, one input thereof being arranged to receive the derived voltage, the two input amplifier having a negative feed-back loop of unity gain, said loop including a switch, and said loop terminating at the second input of said amplifier; the voltage storage device comprising a capacitor connected to be charged by a voltage produced at said second input, said amplifier being connected to provide said difference voltage dependent upon the amount by which the derived voltage at said one input exceeds, at any time, the stored voltage in said capacitor, the control means comprising a differential amplifier arranged to receive the integrated difference voltage as one input thereto and adapted to produce an output of predetermined polarity when said one input to the differential amplifier exceeds in voltage a second input being the output from the reference means to the differential amplifier; the reference means comprising a reference ramp voltage generator arranged to be triggered each time a radar pulse is transmitted and adapted then to produce a voltage decreasing approximately linearly with time; and switch closing means, triggered each time said differential amplifier produces said output of predetermined polarity, for closing said switch for a predetermined time interval.

The said difference voltage may be applied to the integrating means via a circuit including a unilaterally conductive device; a second circuit including a second oppositely sensed unilaterally conductive device extending from the output of the two input amplifier to said integrating means, said second circuit also including an inverter; two switches, one of which is closed when the other is open and vice versa being included one in each of the two circuits; and means actuated when the aforesaid predetermined relative value is reached for simultaneously opening that one of the two switches which is in said second circuit and closing the other of said two switches.

There may be provided means to compare the integrated difference voltage with a calibration voltage, and to actuate alarm means when the magnitude of the integrated difference voltage is less than the magnitude of the calibration voltage.

The radar may comprise receiving equipment adapted to provide said detected received echo signal and having a gain which increases from a predetermined value at the time of commencement of transmission of each transmitted radar pulse as a function of the third power of the time elapsed since said time of commencement.

There may be provided shaping means the output of which is connected to the producing means to produce a shaped derived voltage which follows increasing parts of the derived voltage and which follows decreasing parts until the rate of decrease exceeds a predetermined rate, the shaped derived voltage then decreasing at said predetermined rate, the next following increasing part of the derived voltage being followed if it exceeds the voltage to which the shaped derived voltage has decreased.

According to a further aspect of the present invention there is provided, in an aircraft, a pulsed range-finding radar comprising transmitting equipment and an aerial adapted to transmit a downwardly inclined beam of radar pulses for terrain range finding; a voltage storage device; applying means to apply to said voltage storage device for successive periods a derived voltage derived from and dependent upon a detected received video echo signal; producing means to produce an integrated difference voltage by integrating the difference between the derived voltage and a stored voltage in said voltage storage device when said derived voltage is the greater; control means having an input connected to said producing means and an output connected to said applying means operable to initiate each said period at a time having a relation to the time of commencement of each transmitted radar pulse determined by the instantaneous magnitude of the integrated difference voltage; and means to utilize the integrated difference voltage as an indication of range.

There may be means to receive a signal indicative of the ground speed of an aircraft, and means to derive from said signal and from said indication of range an indication of a time interval after which the aircraft will arrive over the terrain, the range of which is indicated.

The radar may comprise reference means actuated in fixed time relation with the commencement of each transmitted radar pulse to initiate a reference ramp voltage of predetermined rate of change with time; means adapted to adjust said predetermined rate of change as a function of said ground speed signal; said control means operating, each time said reference ramp voltage reaches a predetermined relative value in relation to a second voltage with which it is compared, to initiate each said period; the producing means comprising comparator means to compare the stored voltage in said voltage storage device with the said derived voltage to produce a difference voltage when said derived voltage exceeds said stored voltage, and integrating means to integrate said difference voltage to produce the said integrated difference voltage, the integrated difference voltage being utilized as said second voltage.

Another aerial may be provided to search a region different to that which the first-mentioned aerial is adapted to search, means being provided to sequentially operatively connect the first mentioned aerial and the another aerial to transmitting equipment of the radar for respective predetermined periods of time.

In another aspect the invention provides an aircraft provided with a radar as set forth above.

The invention will be specifically described, merely by way of example, with reference to the accompanying drawings, wherein:

FIG. 1 shows an aircraft having a radar according to the invention,

FIG. 2 shows a plan view on the line 2—2 of the aircraft of FIG. 1,

FIG. 3 shows an advanced characteristic envelope curve discussed hereafter,

FIG. 4 shows part of the circuitry of the radar of FIG. 1, in block diagram form.

Figure 5:
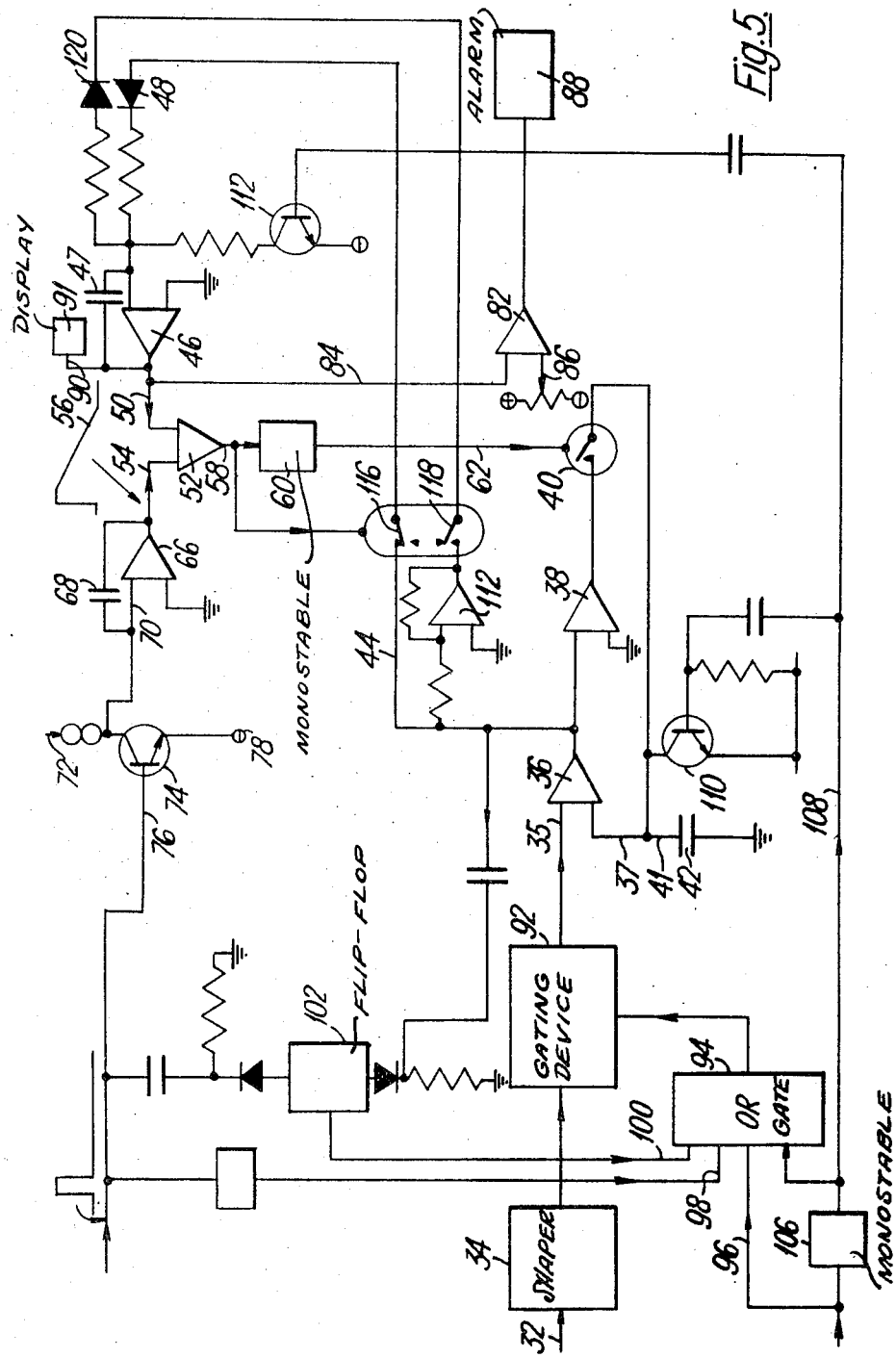
FIG. 5 is a more detailed diagram of the circuitry of FIG. 4.

The specifically described embodiment of the invention is an airborne navigation aiding pulsed radars; arranged to transmit directionally ahead of the aircraft and at a known predetermined angle of depression, to give an indication and/or a warning of the slant range from the aircraft to a region on the terrain which is ahead of the aircraft and at the predetermined angle of depression. Obviously the knowledge of the slant range to such a region is equivalent to knowledge of the height at which the aircraft will pass over that region (the clearance height) if it continues without change in course or height. There is, however, a serious practical difficulty in designing a radar which will measure the slant range with sufficient accuracy. The radar "beam" has in practice (unless an aerial of size and bulk which are prohibitively large for aircraft use is employed) a substantial spread. Moreover, its cross-section of interception by the region, and particularly the axial dimension of that area in the fore and aft direction, is quite large.

Suppose that the cross-section of the transmitted beam intercepted by the region approaches, moves across, and then recedes from a limited area of the region of the same size and shape as the cross section of the beam. When the leading edge of the beam first overlaps the nearer edge of the area considered, the received echo signal coming back from the said area would be very small, but as the beam advances the size of the overlap increases and with it the echo signal received back from said area until a maximum occurs when the intercepted beam cross-section is in register with the area. Thereafter as the beam continues to advance, the received echo signal coming back from said area decreases becoming zero when the trailing edge of the beam finally clears the area considered. So far as that area is concerned, the received signal-time curve (which may be termed the advanced characteristic envelope curve) of the received signal will be of the nature of that shown in FIG. 3 of the accompanying drawings and discussed further hereinafter. It can be seen that the advanced characteristic envelope curve starts at zero, rises to a maximum and then falls away to zero.

The time duration of the advanced characteristic envelope curve obviously depends upon the speed of advance and the spread of the radar beam (in particular upon the length of the intercepted cross-section of the beam in the direction of advance). Obviously also, if the said length of the intercepted beam section is at all substantial — as in practice it will be — the time duration of the advanced characteristic envelope curve will be large in relation to the transmitted pulse period. In an ordinary practical case of a beam transmitted from an aircraft flying at a reasonable height and speed, the time duration of the advanced characteristic envelope curve may be of the order of 300 microseconds or more, whereas the individual transmitted pulses have a duration of (say) 1½ to 3 microseconds. If the range is measured when the advanced characteristic envelope curve is at or close to its maximum, the measurement may be expected to be accurate, but if range measurement is so effected that it can be made at any unknown time during the duration of said curve, then unknown and large errors in range measurement can occur.

The specifically described embodiment of the present invention seeks to provide a means of measuring the range when the advanced characteristic envelope curve is at or close to a maximum value.

Referring to FIGS. 1 and 2, an aircraft 10 has a radar comprising transmitting and receiving equipment 12, and a first aerial 14 and a second aerial 16 which are both connected to the equipment 12. The equipment 12 comprises transmitting equipment common to both aerials 14, 16 and optionally part of the receiving equipment (e.g., the RF stages) is also common to both aerials 14, 16.

The first aerial 14 is a conventional weather radar aerial, and is mounted by any suitable conventional means 20 to traverse about an axis 22 (FIG. 2). The first aerial 14 is thus provided to cause a transmitted radar beam to traverse an arc across the nose of the aircraft, as shown in FIG. 2, thereby scanning a first region comprising an angular sector in front of the aircraft.

The second aerial 16 is mounted behind the first aerial 14 and is adapted to search a second region disposed approximately on the axis of symmetry of the sector searched by the first aerial, and somewhat below that sector. That is to say, the second aerial searches a second region directly in front of the aircraft 10 and somewhat below its flight path.

The equipment 12 can thus provide information regarding the height of the aircraft relative to the terrain over which it is about to fly, by providing an indication of the slant range. The second aerial 16 is pivotally mounted so that it can be pivoted about an axis 23 in response to stabilizing equipment so that it may always be directed at a predetermined angle to the aircarft's flight path, regardless of the aircraft's attitude. Thus if the aircraft is flying in a nose-up attitude, the aerial 16, when seen in FIG. 1, will be pivoted slightly.

Alternatively, in a simpler system, the aerial 16 may be directed at a predetermined angle to the horizontal.

The aerials 14 and 16 are connected to the transmitting and receiving equipment 12 by respective conventional lines 24, 26. Associated with the equipment 12 is an aerial switch means 28, the purpose of which will be apparent hereinafter.

When the first aerial 14 is at the ends of its sweep, as shown in FIG. 2, the information it receives is of limited value to the crew of the aircraft since it relates to weather conditions abeam of the aircraft. The first aerial 14, when in the extreme positions of its traverse, that is to say edge-on to the second aerial 16, does not significantly obstruct the "view" of the second aerial 16, whereas in its intermediate traverse positions the obstruction is significant.

The aerial switch means 28 is therefore controlled to sequentially operatively connect the equipment 12 to the first aerial 14 alone for those periods of time when the aerial 14 is in its intermediate traverse positions, and to connect the equipment 12 to the second aerial 16 alone during those periods of time when the first aerial 14 is at the extremities of its traverse. Thus useful information regarding the terrain over which the aircraft is about to fly, is obtained, instead of the relatively useless information regarding the weather abeam of the aircraft, the terrain information being obtained using the equipment 12 which hitherto has been utilized only to provide weather information. Of course the aerial 16 can be connected to the common equipment 12 when the aerial 14 is at the right-hand extremity of its traverse only, a radar altimeter aerial being connected to the equipment 12 when the aerial 14 is at the left hand extremity of its traverse, as described and claimed in our co-pending U.S. application Ser. No. 851,577.

The aerial switch means 28 is controlled by the angular position of the aerial 14 by any suitable means (not shown). The equipment 12 comprises a conventional "weather radar" receiver and display for use when the first aerial 14 is operatively connected to the equipment 12.

When the equipment 12 is operatively connected to the second aerial 16, radar pulses are transmitted in a diverging beam. Reflected echo signals are received, and are each detected or demodulated in a conventional manner by receiving equipment included in the equipment 12 to form a detected received video echo signal. The receiving equipment 12 has a gain which increases from a predetermined value at the time of commencement of transmission of each transmitted pulse as a function of the third power of the time elapsed since said time of commencement. The increase of gain with time avoids reflected signals originating from minor lobes of the transmitted pulse beam shape being given a false emphasis by the detecting means.

As previously mentioned, the received signal-time envelope curve of the detected received video echo signal is as shown in FIG. 3, and in order to obtain an accurate indication of the range of the second region it is desirable to measure the range when the curve is at or near a maximum, such as shown at 30 in FIG. 3.

In order to determine the said range when the curve of FIG. 3 is at its maximum, a derived voltage derived from and dependent on the received video echo signal is fed via a line 32 to a pulse shaper 34 (FIG. 4). The shaper 34 produces a shaped derived voltage which follows increasing parts of the unshaped derived voltage and follows decreasing parts until the rate of decrease exceeds a predetermined rate, the shaped derived voltage then decreasing at said predetermined rate, the next following increasing part of the unshaped derived voltage being followed if it exceeds the voltage to which the shaped derived voltage has decreased.

The shaped derived voltage is then fed to a non-inverting input 35 of a two-input difference amplifier 36, which constitutes a comparator the output of which is fed to a non-inverting amplifier 38. The output of the amplifier 38 is fed to a switch 40, and when the switch is closed, thence to a terminal 41 of a large capacitor 42. The other terminal of the capacitor 42 is grounded. The terminal 41 is also connected to a second input 37 of the amplifier 36, which has a high impedance.

Thus, when the switch 40 is closed, the shaped derived voltage is applied to the capacitor 42, which constitutes a voltage storage device, the amplifiers 36 and 38 having a negative feed-back loop with substantially unity gain, so that the voltage at the second input 37 equals the voltage at the input 35. When the switch 40 is open, the voltage across the capacitor 42 remains substantially constant at the value of the derived voltage at the instant the switch 40 was opened, due to high impedance of the input 37.

When the switch 40 is open, the amplifier 36 is open-circuited, and has a very high gain. The amplifier 36 then amplifies the difference between the shaped derived voltage on input 35 and the stored voltage across the capacitor 42, the output of the amplifier being positive when the shaped derived voltage exceeds the stored voltage, and negative when it is less than the stored voltage.

The output difference voltage of the amplifier 36 is fed via a line 44 and a unilateral current device comprising a rectifier 48 to an integrator constituted by an inverting amplifier 46, having a capacitor 47 across its input and output terminals. The rectifier 48 allows only the positive parts of the difference voltage on the line 44 to pass to the integrator 46, 47. The integrator 46, 47 thus produces an integrated difference voltage corresponding to only the positive portions of the difference voltage.

The integrated difference voltage is fed via a line 50 to control means comprising a differential amplifier 52. The differential amplifier 52 is also supplied via a line 54 with a saw tooth reference ramp voltage having a frequency equal to the pulse repetition frequency of the transmitted pulses, a ramp portion 56 of its wave form decreasing linearly at a predetermined rate with time. The peak value of the reference ramp voltage on the line 54 exceeds the integrated difference voltage on the line 50, but becomes less than that signal during the portion 56 of its waveform. As the reference ramp voltage on the line 54 falls below the integrated difference voltage, the output of the differential amplifier 52 changes polarity. The output of the differential amplifier 52 is fed via a line 58 to a switch closing means comprising a monostable 60, which, when the output on the line 58 changes polarity, emits a short pulse of the order of 2 – 10 microseconds typically 5 microseconds which is fed to the switch 40 via a line 62. For the short period corresponding to the duration of the 5 microsecond pulse, the switch 40 is closed, and the stored voltage across the capacitor 42 follows the shaped derived voltage pulse on the line 32, as hereinbefore described.

If, during the 5 microsecond pulse, the shaped derived voltage exceeds the stored voltage already stored in the capacitor 42, the stored voltage is increased to the value of the shaped derived voltage.

The saw tooth ramp reference voltage is produced by a reference means comprising an integrator consisting of an amplifier 66 with a capacitor 68 connected between its output and one of its inputs 70, the other input being grounded. The amplifier 66 is provided at its input 70 with a constant current via a line 72.

Initially, the output voltage of the amplifier 66 has a maximum value, but the sum of the currents at the input 70 is made zero, so the voltage across the capacitor 68, and therefore the output voltage of the amplifier 66, decreases proportionately with time. The said reference means also comprises a transistor 74 which has its base supplied via a line 76 with the pre-pulse or timing pulse of the equipment 12. For the duration of each pre-pulse the transistor connects the input 70 to a terminal 78 causing a current to flow through the input 70 in the opposite direction to the aforementioned constant current. This causes the output voltage of the amplifier 66 to revert to its maximum value. Thus the voltage on the line 54 has a frequency equal to the pulse repetition frequency of the transmitted pulses, the said voltage having a ramp portion 56 which is proportional to time. The slope of the portion 56 is proportional to the constant current in the line 72.

The said reference means is thus actuated in fixed time relation to produce the reference ramp voltage in fixed time relation with the commencement of each transmitted pulse. The control means 52, 60 thus initiates each five microsecond pulse at a time having a relation to the time of commencement of each transmitted pulse determined by the instantaneous magnitude of the integrated difference voltage on the line 50, since the 5 microsecond pulse is initiated when the reference ramp voltage falls below the integrated difference voltage.

Thus, in operation, each time a pulse is transmitted, the switch 40 is closed for 5 microseconds and the shaped derived voltage is thus applied to the capacitor 42 for the short period of 5 microseconds, the stored voltage across the capacitor 42 being increased to equal the derived voltage if the latter is the greater. When the switch 40 is opened, the derived voltage is compared to the stored voltage, represented at 80 in FIG. 3, and if the derived voltage is greater, the positive difference voltage is integrated. Since the difference voltage is not integrated when the stored voltage is greater than the derived voltage, the integrated difference voltage only changes in an increasing direction. Since the amplifier 46 is an inverting amplifier, the integrated difference voltage on the line 50 has reversed polarity compared to the signal on the line 44. An increase in the value of the integrated difference voltage will therefore cause the control means 52, 60 to initiate the next 5 microsecond pulse at a point later in time relative to the time of commencement of the next transmitted pulse, causing the stored voltage 80 (FIG. 3) to approach more nearly the derived voltage at the peak 30 of the advanced characteristic envelope curve of the detected pulse. It can thus be seen that the stored voltage 80 is automatically caused to approach the peak derived voltage corresponding to the peak 30, of the advanced characteristic envelope curve. The finish of the 5 microsecond pulse that gives rise to a stored voltage 80 very close to the maximum value of the derived voltage occurs very close in time to the reception of the peak 30 of the advanced characteristic envelope curve.

Since the time at which the end of this five microsecond pulse occurs is accurately indicative of the slant range of the region, and since its timing is dependent upon the value of the integrated difference voltage signal on the line 50, it follows that the value of the integrated difference voltage is itself indicative of the slant range of the region. Since the beam is transmitted at a fixed angle below the flight path of the aircraft, this slant range is also a measure of the clearance height at which the aircraft would overfly the region if its flight path were to remain unchanged. Furthermore, means may be provided to control the predetermined linear rate of change of the portion 56 of the ramp reference voltage on the line 54 so that it is negatively proportional to the aircraft ground speed. This may be effected by a circuit which receives a signal indicative of the aircraft ground speed and which controls; the said constant current on the line 72 to be negatively proportional thereto. Then the integrated difference voltage becomes negatively proportional to the time interval after which the aircraft would arrive over the region if its flight path and ground speed were to remain unchanged.

Thus the pilot of an aircraft may be provided with knowledge of the slant range, or of the clearance height, or with a warning if the slant range or clearance height falls below a predetermined safe minimum, (which may be selected to suit the aircraft speed), and then will be protected against flying in ignorance into high ground ahead of him. In order to attract the attention of the pilot, if the clearance height is below a predetermined minimum, warning means are provided which operate when the integrated difference voltage is below a predetermined value.

Referring to FIG. 5 which shows the circuit of FIG. 4 in more detail, the warning means comprise an amplifier 82 one input of which is connected via a line 84 to the output of the amplifier 46 and one input of which is connected to a potential divider 86. The potential divider 86 may be adjusted to apply to the amplifier 82 a calibration voltage corresponding to a predetermined minimum clearance height, say 2,000 feet. The other output of the amplifier 82 is connected to an audible or visual alarm 88 in the aircraft's cockpit. When the magnitude of the integrated difference voltage on the line 84 exceeds the voltage applied from the potential divider 86, the output of the amplifier 82 is of a given polarity which does not actuate the alarm 88. However, if the magnitude of the integrated difference voltage becomes less than the magnitude of the voltage from the potential divider 86 due to a reduction in the clearance height, the output of the amplifier 82 changes polarity, actuating the alarm 88. The integrated difference voltage is also fed via a line 90 to a display 91 indicating the time interval after which the aircraft would arrive at the said region if its flight path and ground speed remain unchanged. This display is normally inoperative, but is actuated by the actuation of the alarm 88.

The shaped derived voltage after leaving the pulse shaper 34 passes through a gating device 92 and thence to the input 35 of the amplifier 36. The gating device 92 is controlled by an 'OR' gate 94. The aerial switch means 28 (FIG. 1) is arranged to emit a control signal during the time in which the second aerial 16 is disconnected from the equipment 12. The control signal is fed via a line 96 to the 'OR' gate 94, causing it to operate the gating device 92 to prevent the passage of the derived voltage therethrough. The 'OR' gate 94 has a further input 98, via which input 98 is applied a pulse of 15 microseconds duration commencing at the start of each transmitted pulse. The gating device 92 thus inhibits the derived voltage in the line 32 for this period, in order to avoid spurious signals reflected from the ground directly below the aircraft.

A further input 100 to the 'OR' gate 94 is derived from a flip-flop 102. One input of the flip-flop 102 is connected to the output of the amplifier 36, and the other is connected to the line 76 and is thus in receipt of the pre-pulses. The flip-flop 102 is arranged to produce a signal at the input 100 of the 'OR' gate 94 for the period between the first negative going edge in the difference voltage produced by the amplifier 36, this edge occurring when the difference signal changes polarity, (corresponding to the point at which the shaped derived voltage falls below the stored voltage across the capacitor 42), and the end of the next following prepulse on the line 76. The derived voltage on the line 32 is thus inhibited by the gating device 92 for this period, which of course ends before the commencement of the five microsecond pulse on the line 62, which closes the switch 40. The gating device 92 also provides clamping and D.C. restoration, fixing the troughs of the derived voltage applied to the input 35 at a predetermined level.

The control signal from the aerial switch means 28 is also fed to a monostable 106 which produces a 10 millisecond pulse on a line 108. This pulse is fed to two transistors 110, 112. The transistors connect the capacitors 42 and 47 to ground for the duration of this pulse, partially discharging them. If the capacitors 42 and 47 were not regularly partially discharged, a failure could occur in the circuit "upstream" of the integrator 46, 47 which would not immediately affect the value of the integrated difference voltage in the line 50, resulting in incorrect information being passed to the aircraft's crew. However, by partially discharging the capacitors 42 and 47, any faults cause the integrated difference voltage to decrease, actuating the alarm 88 as if the clearance height was less than the predetermined value.

FIG. 5 also shows a refinement of the circuit of particular value when the aircraft is turning.

If it is assumed that an aircraft is flying on a straight course, and the apparatus hereinbefore described has located terrain in front of the aircraft and has computed the range thereof, then, if the aircraft turns, the apparatus may receive signals reflected from terrain closer to the aircraft than the terrain previously located while still receiving signals from the latter. Such terrain would produce a second peak in the FIG. 3 curve, in advance of the peak 30. However, the terrain may be such that the reflected signals are weaker than those previously received and the second peak is smaller than the peak 30. The second peak would thus be ignored by the apparatus since it locates the larger peak 30 of the reflected signal. An incorrect indication of the clearance height would thus be obtained. There is therefore provided an inverting amplifier 113, having unity gain, the input to which is taken from the output of the amplifier 36 on the line 44. The output of the amplifier 113 is an inverted difference signal corresponding to the signal on the line 44. The inverted difference voltage, and the difference voltage on the line 44, are respectively taken to ganged switches 118, 116. The switch 116 is normally closed, the other switch 118 being normally open. The difference voltage signal on the line 44 may pass via a first circuit including the switch 116 to the integrator 46, 47 as in FIG. 4. The inverted difference signal may pass via a second circuit including the switch 118 and a second unilaterally conductive device comprising a rectifier 120, to the integrator 46, 47. The rectifier 120 is connected so as to be oppositely sensed to the rectifier 48. The switches 116, 118 are controlled by the output on line 58 of the differential amplifier 52. The switches are such that, during the time before the output on the line 58 changes polarity and operates the monostable 60, the switch 116 is open and the switch 118 is closed. The switches revert to their states shown in FIG. 5 when the output of the differential amplifier 52 on the line 58 changes polarity.

The polarity of the difference signal supplied to the integrator 46, 47 is thus reversed or inverted for a time preceding each five microsecond pulse. The differential amplifier 52 then adjusts the stored voltage across the capacitor 42 (by altering the timing of the initiation of the 5 microsecond pulse) to cause the storage voltage to more nearly approach a maximum value of the derived voltage associated with the aforementioned second peak which may occur in that time, instead of approaching the value of derived voltage associated with the peak 30. This second maximum value corresponds to relatively weak reflected signals received from relatively close terrain located while the aircraft is turning. An accurate indication of the range of the nearest terrain thus may be obtained.

We claim:

1. A pulse range-finding radar comprising means to transmit radar pulses; a voltage storage device; applying means to apply to said voltage storage device for successive periods of time a derived voltage derived from and dependent upon a detected received video echo signal; producing means to produce an integrated difference voltage by integrating the difference between the derived voltage and a stored voltage in said voltage storage device when said derived voltage is the greater; control means having an input connected to said producing means and an output connected to said applying means operable to initiate each said period at a time having a relation to the time of commencement of each transmitted radar pulse said relation being determined by the instantaneous magnitude of the integrated difference voltage; and means to utilize the integrated difference voltage as an indication of range.

2. A radar as claimed in claim 1 further comprising comparator means connected between the voltage storage device and the applying means to compare the derived and stored voltages during said periods, and if the derived voltage exceeds the stored voltage in said voltage storage device, to increase the stored voltage to the value of the said derived voltage during said periods.

3. A radar as claimed in claim 1 further comprising reference means actuated in fixed time relation with the commencement of each transmitted radar pulse to initiate a reference ramp voltage of predetermined rate of change with time; said control means operating, each time said reference ramp voltage reaches a predetermined relative value in relation to a second voltage with which it is compared, to initiate each said period; the producing means comprising comparator means to compare the stored voltage in said voltage storage device with the said derived voltage to produce a difference voltage when said derived voltage exceeds said stored voltage and integrating means to integrate said difference voltage to produce the said integrated difference voltage, the integrated difference voltage being utilized as said second voltage.

4. A radar as claimed in claim 3 wherein the comparator means comprises a two input amplifier, one input thereof being arranged to receive the derived voltage, the two input amplifier having a negative feed-back loop of unity gain, said loop including a switch, and said loop terminating at the second input of said amplifier; the voltage storage device comprising a capacitor connected to be charged by a difference voltage dependent upon the amount by which the derived voltage at said one input exceeds, at any time, the stored voltage in said capacitor; the control means comprising a differential amplifier arranged to receive the integrated difference voltage as one input thereto and adapted to produce an output of predetermined polarity when said one input to the differential amplifier exceeds in voltage a second input said second input being the output from said reference means; and switch closing means, triggered each time said differential amplifier produces said output of predetermined polarity, for closing said switch for a predetermined time interval.

5. A radar as claimed in claim 4 further comprising a circuit including a unilaterally conductive device via which circuit the said difference voltage is applied to the integrating means; a second circuit including a second oppositely sensed unilaterally conductive device extending from the output of the two input amplifier to said integrating means, said second circuit also including an inverter; two switches, one of which is closed when the other is open and vice versa being included one in each of the two circuits; and means actuated when the aforesaid predetermined relative value is reached for simultaneously opening that one of the two switches which is in said second circuit and closing the other of said two switches.

6. A radar as claimed in claim 1 further comprising an alarm means and means to compare the integrated difference voltage with a calibration voltage and to actuate said alarm means when the magnitude of the integrated difference voltage is less than the magnitude of the calibration voltage.

7. A radar as claimed in claim 1 further comprising receiving equipment adapted to provide said detected received echo signal and having a gain which increases from a predetermined value at the time of commencement of transmission of each transmitted radar pulse as a function of the third power of the time elapsed since said time of commencement.

8. A radar as claimed in claim 1 further comprising shaping means, the output of which is connected to the producing means to shape said derived voltage to follow increasing parts of the unshaped derived voltage derived from said video echo signal and to follow decreasing parts until the rate of decrease exceeds a predetermined rate, the shaped derived voltage then decreasing at said predetermined rate, the next following increasing part of the unshaped derived voltage being followed if it exceeds the voltage to which the shaped derived voltage has decreased.

9. In an aircraft, a pulsed range-finding radar comprising transmitting equipment and an aerial adapted to transmit a downwardly inclined beam or radar pulses for terrain range finding; a voltage storage device; applying means to apply to said voltage storage device for successive periods a derived voltage derived from and dependent upon a detected received video echo signal; producing means to produce an integrated difference voltage by integrating the difference between the derived voltage and a stored voltage in said voltage storage device when said derived voltage is the greater; control means having an input connected to said producing means an an output connected to said applying means operable to initiate each said period at a time having a relation to the time of commencement of each transmitted radar pulse said relation being determined by the instantaneous magnitude of the integrated difference voltage; and means to utilize the integrated difference as an indication of range.

10. A radar as claimed in claim 9 further comprising means to receive a signal indicative of the ground speed of an aircraft; and means to derive from said signal and from said indication of range an indication of a time interval after which the aircraft will arrive over the terrain, the range of which is indicated.

11. A radar as claimed in claim 10 further comprising reference means actuated in fixed time relation with the commencement of each transmitted radar pulse to initiate a reference ramp voltage of predetermined rate of change with time; means adapted to adjust said predetermined rate of change as a function of said ground speed signal; said control means operating, each time said reference ramp voltage reaches a predetermined relative value in relation to a second voltage with which it is compared, to initiate each said period; the producing means comprising comparator means to compare the stored voltage in said voltage storage device with the said derived voltage to produce a difference voltage when said derived voltage exceeds said stored voltage and integrating means to integrate said difference voltage to produce the said integrated difference voltage, the integrated difference voltage being utilized as said second voltage.

12. A radar as claimed in claim 9, wherein another aerial is provided to search a region different to that which the first-mentioned aerial is adapted to search, means being provided to sequentially operatively connect the first mentioned aerial and the another aerial to transmitting equipment of the radar for respective predetermined periods of time.

* * * * *